United States Patent
Puggelli et al.

(10) Patent No.: US 10,958,164 B1
(45) Date of Patent: Mar. 23, 2021

(54) TRANSIENT CONTROL FOR SWITCHED-CAPACITOR REGULATORS

(71) Applicant: Apple Inc., Cupertino, CA (US)

(72) Inventors: Alberto Alessandro Angelo Puggelli, Cupertino, CA (US); Ahmed M. Sawaby, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/839,980

(22) Filed: Apr. 3, 2020

(51) Int. Cl.
*H02M 3/07* (2006.01)

(52) U.S. Cl.
CPC ..................... *H02M 3/07* (2013.01)

(58) Field of Classification Search
None
See application file for complete search history.

(56) References Cited

U.S. PATENT DOCUMENTS

| | | | | |
|---|---|---|---|---|
| 5,982,222 A * | 11/1999 | Kyung | ................ | G11C 5/145 327/536 |
| 6,198,645 B1 * | 3/2001 | Kotowski | ............... | H02M 3/07 307/110 |
| 7,907,429 B2 * | 3/2011 | Ramadass | ............... | H02M 3/07 363/59 |
| 8,072,256 B2 * | 12/2011 | Pyeon | ................. | G11C 11/4076 327/536 |
| 8,159,091 B2 * | 4/2012 | Yeates | .................... | H02M 3/07 307/110 |
| 8,755,242 B2 * | 6/2014 | Lee | ......................... | H02M 1/15 365/226 |
| 8,848,476 B2 * | 9/2014 | Kuo | ......................... | G11C 16/30 365/226 |
| 9,570,976 B2 * | 2/2017 | Karadi | ................... | H05B 45/60 |
| 9,634,577 B2 | 4/2017 | Perreault | | |
| 9,882,470 B2 * | 1/2018 | Jeong | .................... | H02M 3/07 |
| 10,069,408 B2 | 9/2018 | Abdulslam et al. | | |
| 2011/0304306 A1 | 12/2011 | Galal et al. | | |

* cited by examiner

*Primary Examiner* — Jeffery S Zweizig
(74) *Attorney, Agent, or Firm* — Kowert, Hood, Munyon, Rankin & Goetzel, P.C.

(57) ABSTRACT

A power converter circuit included in a computer system may include multiple switched-capacitor circuits that may each be configured to generate a particular voltage level on a regulated power supply node according to a corresponding conversion ratio. A control circuit may, in response to detection of a regulation event, sequentially change the conversion ratios of the multiple-switched capacitor circuits.

20 Claims, 9 Drawing Sheets

TRANSIENT CONTROL FOR SWITCHED-CAPACITOR REGULATORS

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulated power supply voltage level are disclosed. Broadly speaking, a power converter circuit may include switched-capacitor circuit that includes a plurality of interleave circuit, wherein the switched-capacitor circuit is configured to sequentially activate each of the plurality of interleave circuits to generate a particular voltage level on a regulated power supply node. A control circuit may monitor one or more operating parameters associated with the switched-capacitor circuit, and detect, using result from monitoring the one or more operating parameters, a regulation event. In response to a detection of a regulation event, the control circuit may be further configured to progressively change a corresponding conversion ratio for each of the plurality of interleave circuits. In another embodiments, the switched-capacitor circuit may be further configured to close a first subset of the plurality of for a first time period to charge the regulated power supply node using a subset of the plurality of capacitors, and close a second subset of switches for a second time period to discharge the regulated power supply node using the subset of the plurality of capacitors. The first and second subsets of the plurality of switches and the subset of the plurality of capacitors may be specified by a particular conversion ratio.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ regulator circuits that include both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a switched-capacitor circuit. Such converter circuits include multiple capacitors and switches, which are used to couple different ones of the capacitors between a regulated power supply node and either an input power supply node or a ground supply node at different times to generate a desired voltage level on the regulated power supply node.

In some cases, the capacitors and switches included in a switched-capacitor circuit are partitioned into smaller circuit segments (referred to as "interleave circuits" or simply "interleaves") that are sequentially activated. Such partitioning delivers less charge to the regulated supply node during each charge phase, thereby reducing output voltage ripple and power dissipated in the load, as well as reducing the amplitude of switching noise, and lowering the stress to the input power-delivery network. Using a number interleave circuits is, however, limited by physical design considerations. The inventors realized that a single switched-capacitor could be used with different switch configurations to provide different numbers of interleave circuits. Give the capability to reconfigure a number of interleave circuits included in a switched-capacitor circuit, the inventors further realized that the interleave factor and, therefore, the number of interleave circuits of the switched-capacitor can be adjusted during operation to improve performance of a power converter circuit. As used herein, an interleave factor refers to a number of segments into which the capacitors of a switched-capacitor circuit are partitioned.

It is desirable that power converter circuits that employ switched-capacitor circuits maintain high conversion efficiency over a range of operating conditions. In some cases, variation of an output current provided the power converter to a load circuit, variation of an input voltage level supplied to the power converter circuit, or other changes in operating parameters of a power converter circuit can result in degradation of the conversion efficiency of the power converter circuit. For example, as the output current of a power converter circuit increases, the switching frequency of the power converter circuit will increase until the fast switching limit (FSL) is reached, at which point a conversion ratio of the power converter must be changed to maintain regulation. The inventors realized that changes in conversion ratio could result in further efficiencies, but that by progressively switching the operating modes of the different interleaves, the efficiency of the power converter circuit may be improved.

The embodiments illustrated in the drawings and described below may provide techniques for operating a power converter circuit, which includes a reconfigurable switched-capacitor circuit, to improve performance of the power converter circuit by progressively changing, in response to changes in operating parameters, the conversion ratio of interleaves in the switched-capacitor circuit, and during steady-state operation, dynamically increasing the interleave factor to improve performance of the power converter circuit.

Figure 1:
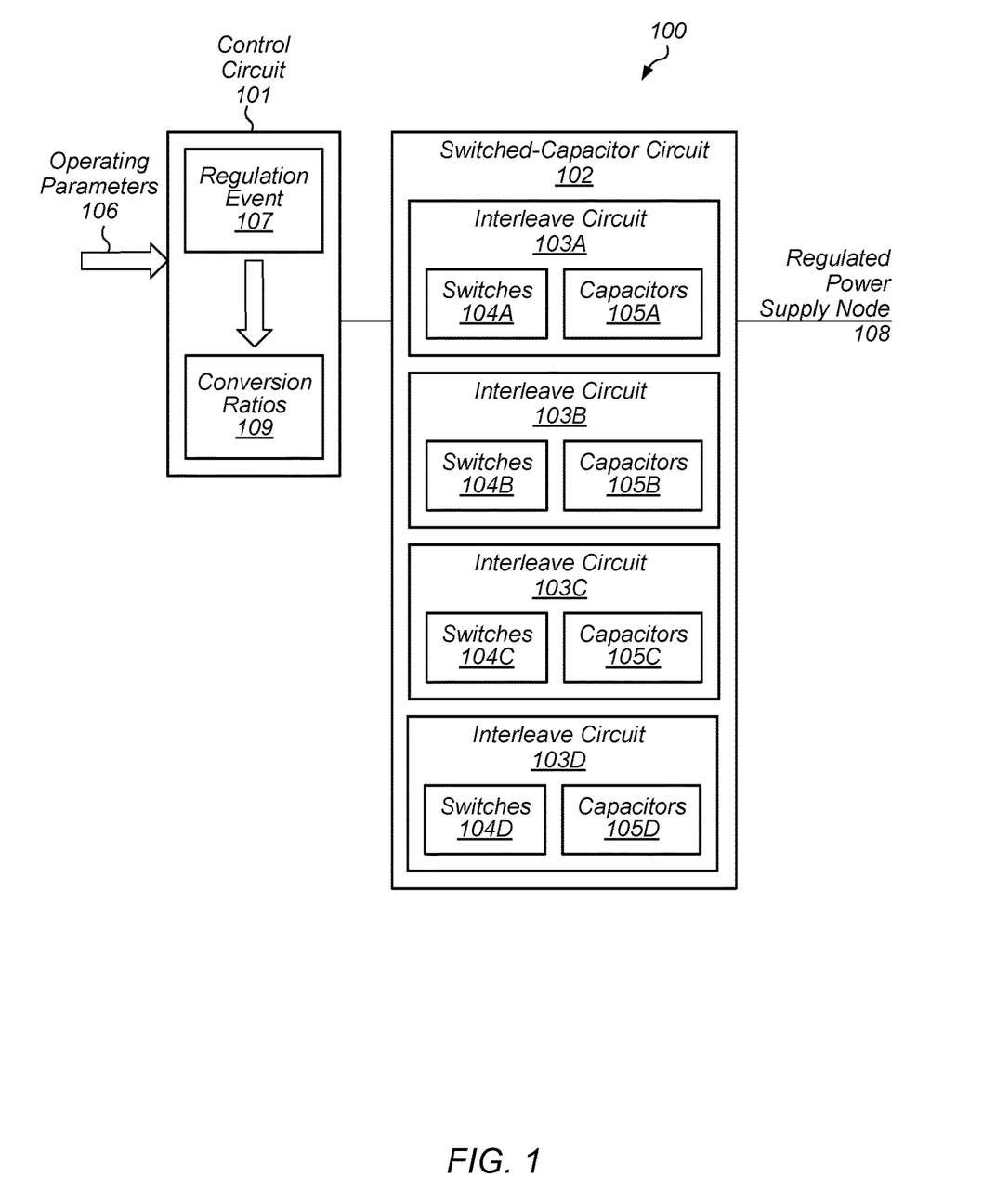
FIG. 1 is a block diagram of an embodiment of a power converter circuit.

Turning to FIG. 1, a block diagram of an embodiment of a power converter circuit is depicted. As illustrated, power converter circuit 100 includes control circuit 101 and switched-capacitor circuit 102, which includes interleave circuits 103A-D. Although four interleave circuits are depicted in the embodiment of switched-capacitor circuit 102 depicted in FIG. 1, in other embodiments, any suitable number of interleave circuits may be employed. Interleave circuits 103A-D include switches 104A-D, respectively, and capacitors 105A-D, respectively.

Switched-capacitor circuit 102 is configured to sequentially activate interleave circuits 103A-D to generate a particular voltage level on regulated power supply node 108. As described below in more detail, to activate a particular one of interleave circuits 103A-D, switched-capacitor circuit 102 may be further configured to close a first subset of switches included in the particular one of interleave circuits 103A-D for a given time period. After the given time period has elapsed, switched-capacitor circuit 102 may be further configured to open the first subset of switches and close a second subset of switches included in the particular one of interleave circuits 103A-D for a different time period.

Control circuit 101 is configured to monitor operating parameters 106. In various embodiments, operating parameters may be associated with switched-capacitor circuit 102 or with power converter circuit 100. As used and described herein, an operating parameter refers to an electrical characteristic of either switched-capacitor circuit 102 or power converter circuit 100 resulting from operation of the aforementioned circuits, and an electrical characteristic of an input signal(s) to either of the aforementioned circuits.

Control circuit 101 is further configured to detect regulation event 107 using results from monitoring operating parameters 106. In various embodiments, to detect regulation event 107, control circuit 101 may be further configured to compare at least one of operating parameters 106 to a corresponding threshold value. In response to a detection of regulation event 107, control circuit 101 is configured to progressively change a corresponding one of conversion ratios 109 for each of interleave circuits 103A-D. By sequentially increasing the conversion ratio of the interleave circuits, power converter circuit 100 may maintain efficiency and regulation during changes to operating parameters.

Figure 2:
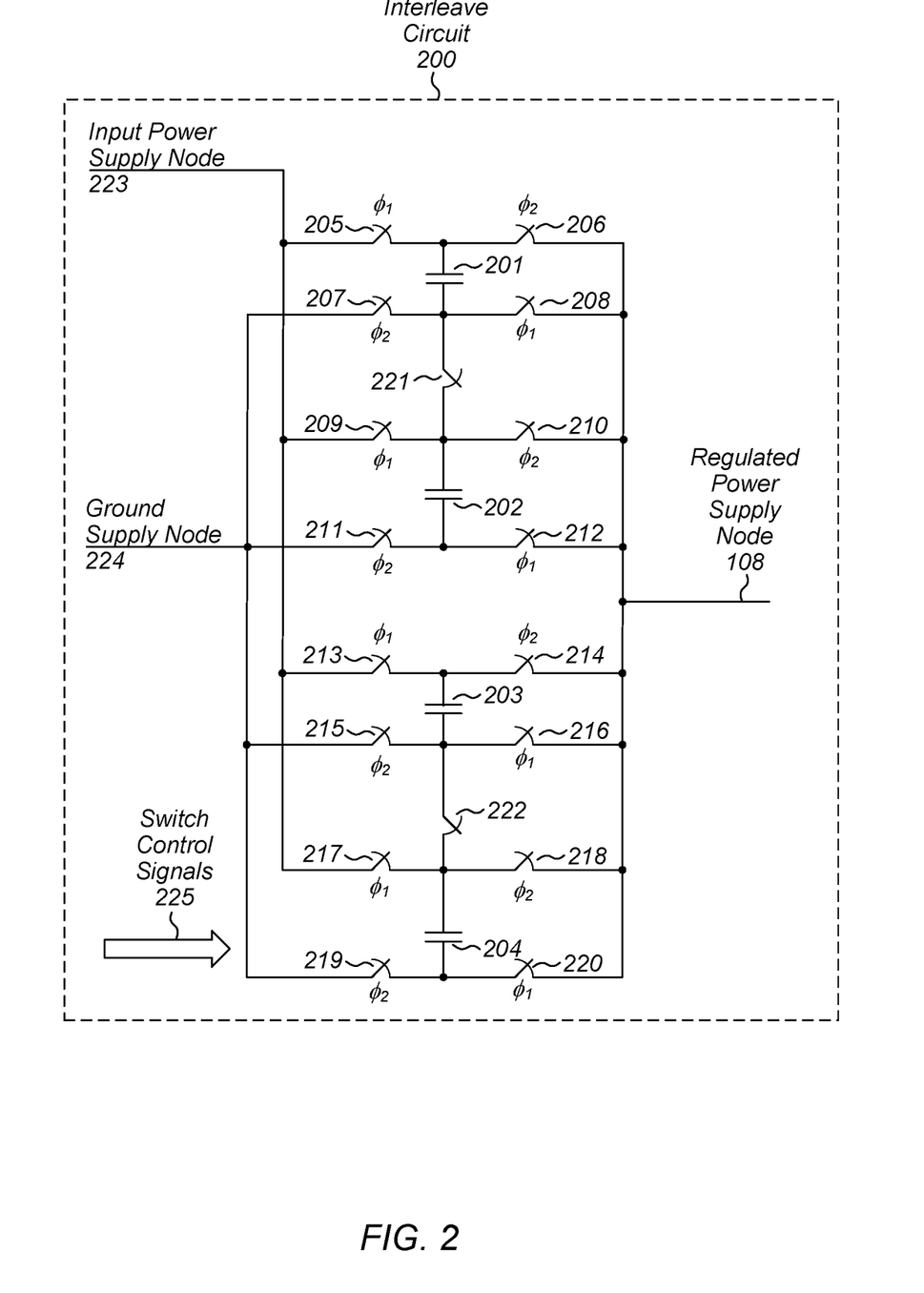
FIG. 2 is a block diagram of an embodiment of an interleave circuit using a particular conversion ratio.

As described above, the conversion ratio of a interleave circuit may be changed during operation to accommodate different regulation events. To accomplish the change in conversion ratio, different combinations of switches are used during the charge and discharge period of a given interleave circuit. By used different switches different amounts of capacitance can be used during the charge and discharge periods, thereby changing the conversion ratio. An embodiment of such a configurable interleave circuit is depicted in FIG. 2. As illustrated, interleave circuit 200 includes capacitors 201-204, and switches 205-222, which are connected to respective ones of switch control signals 225. As described below in more detail, different ones of switch control signals 225 may be activated in different phases, such as the illustrated $\phi_1$ and $\phi_2$. The phase to which a particular one of switch control signal 225 is assigned may be based, at least in part, on a conversion ratio selected for interleave circuit

200. Interleave circuit 200 may, in various embodiments, correspond to any of interleave circuits 103A-D as depicted in FIG. 1.

Capacitor 201 is coupled to switches 205-208. Switches 206 and 208 are coupled to regulated power supply node 108. The respective switch control signals for switches 206 and 208 are assigned to phases $\phi_2$ and $\phi_1$, respectively. Switch 205 is further coupled to input power supply node 223 and its corresponding switch control signals is assigned to $\phi_1$, while switch 207 is coupled ground supply node 224 and its corresponding switch control signal is assigned to $\phi_2$.

Capacitor 202 is coupled to switches 209-212. Switches 210 and 212 are coupled to regulated power supply node 108. The respective switch control signals for switches 210 and 212 are assigned to phases $\phi_2$ and $\phi_1$, respectively. Switch 209 is further coupled to input power supply node 223 and its corresponding switch control signal is assigned to $\phi_1$, while switch 211 is coupled ground supply node 224 and its corresponding switch control signal is assigned to phase $\phi_2$. Switches 207-210 are also coupled to switch 211. As noted above, the embodiment of interleave circuit 200 depicted in FIG. 2 is configured to operate using a conversion ratio of 2:1. As such, the corresponding switch control signal for switch 221 is not assigned to either of phases $\phi_1$ or $\phi_2$ and, as such, remains in an open position.

Capacitor 203 is coupled to switches 213-216. Switches 214 and 216 are coupled to regulated power supply node 108. The respective switch control signals for switches 214 and 216 are assigned to phases $\phi_2$ and $\phi_1$, respectively. Switch 205 is further coupled to input power supply node 223 and its corresponding switch control signal is assigned to phase $\phi_1$, while switch 207 is coupled ground supply node 224 and its corresponding switch control signal is assigned to phase $\phi_2$.

Capacitor 204 is coupled to switches 217-220. Switches 218 and 220 are coupled to regulated power supply node 108. The respective switch control signals for switches 218 and 220 are assigned to phases $\phi_2$ and $\phi_1$, respectively. Switch 217 is further coupled to input power supply node 223 and its corresponding switch control signal is assigned to $\phi_1$, while switch 219 is coupled ground supply node 224 and its corresponding switch control signal is assigned to phase $\phi_2$. Switches 217-220 are also coupled to switch 222. Like the switch control signal for switch 221, the corresponding switch control signal for switch 222 is not assigned to either of phases $\phi_1$ or $\phi_2$ and, as such, remains in an open position.

During operation, switches, whose switch control signals are assigned to phase $\phi_1$, are closed, coupling regulated power supply node 108 to input power supply node 223 via capacitors 201-204. After a particular period of time, switches, whose switch controls signals are assigned to phase $\phi_1$, are closed, and switches whose switch control signals are assigned to phase $\phi_2$ (e.g., switch 206) are closed, coupling each of capacitors 201-204 between regulated power supply node 108 and ground supply node 224. As noted above, switches 221 and 222 remain open during both phases $\phi_1$ and $\phi_2$.

Capacitors 201-204 may, in various embodiments, be discrete components located external to an integrated circuit that includes switches 205-222 and control circuit 101. Switches 205-222 may, in some embodiments, be implemented using one or more metal-oxide semiconductor field-effect transistors (MOSFETs) or other suitable switching devices. It is noted that although four capacitors and 18 switches are depicted in the embodiment illustrated in FIG. 2, in other embodiments, different numbers of capacitors and switches may be employed.

Figure 3:
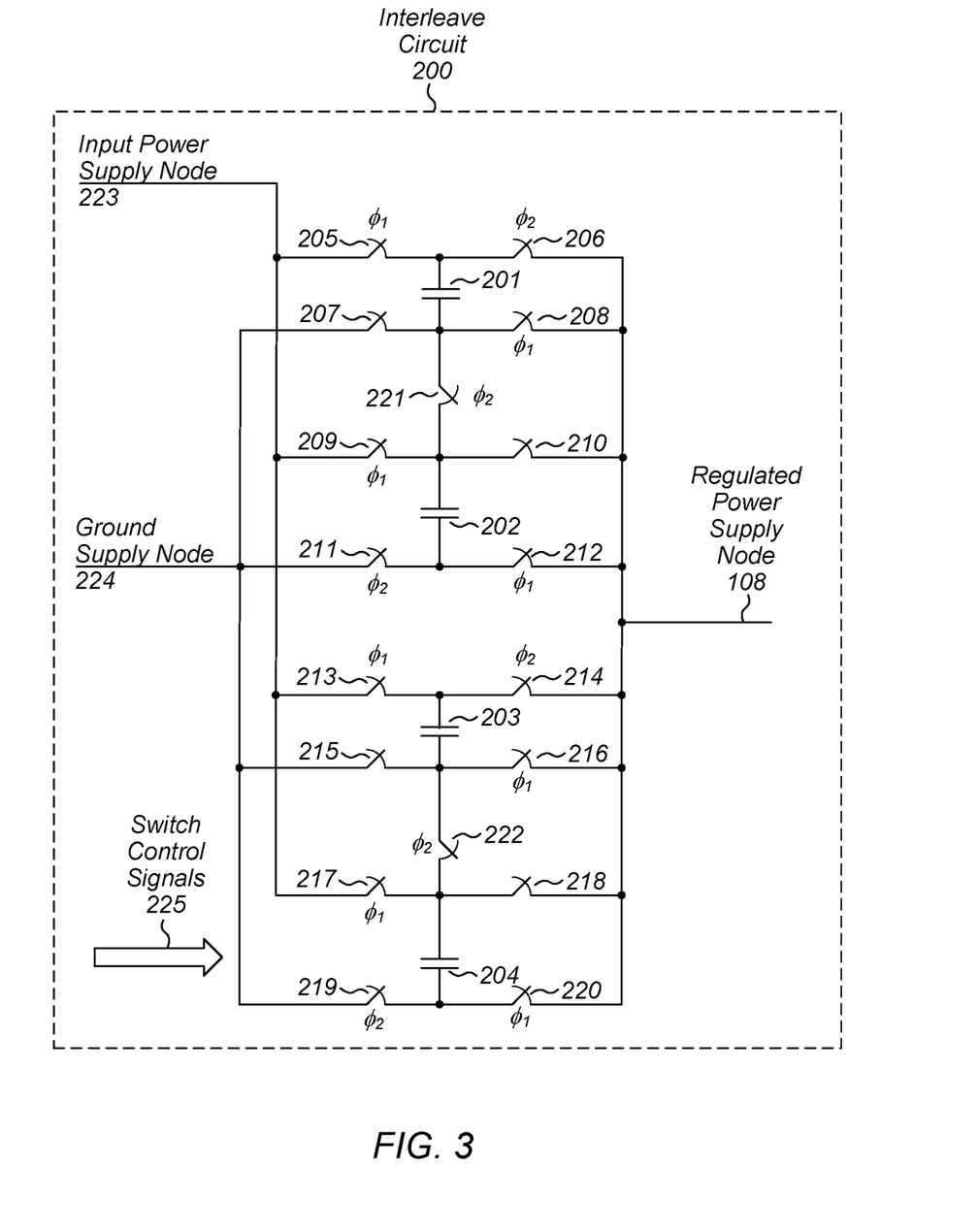
FIG. 3 is a block diagram of an embodiment of an interleave circuit using a different conversion ratio.

As noted above, a conversion ratio is used to assign different ones of switch control signals 225 to different phases, thereby specifying how capacitors 201-204 are used during the charge and discharge periods. A different assignment of switch control signals 225 is depicted in the embodiment of FIG. 3. As illustrated, switch control signals 225 have been re-assigned to different phases to provide a 3:2 conversion ratio.

As illustrated, the switch control signals corresponding to switches 205, 208, 209, 212, 213, 216, 217, and 220 as assigned to phase $\phi_1$. The switch control signals corresponding to switches 206, 221, 211, 214, 222, and 219 are assigned to $\phi_2$. The switch control signals corresponding to switches 207, 210, 215, and 218 are not assigned to either $\phi_1$ or $\phi_2$, thereby allowing switches 207, 210, 215, and 218 to remain open during operation During operation, switches 205, 208, 209, 212, 213, 216, 217, and 220 are closed during phase $\phi_1$, thereby coupling capacitors 201 and 202 in series between input power supply node 223 and regulated power supply node 108, as well as coupling capacitors 203 and 204 in series between input power supply node 223 and regulated power supply node 108. When phase $\phi_1$ is complete, switches 205, 208, 209, 212, 213, 216, 217, and 220 are opened, and phase $\phi_2$ begins with the closing of switches 206, 211, 214, 219, 221, and 222. With switches 206, 211, 214, 219, 221, and 222, closed, capacitors 201 and 202 are coupled in series between regulated power supply node 108 and ground supply node 224. In a similar fashion, capacitors 203 and 204 are coupled in series between regulated power supply node 108 and ground supply node 224.

It is noted that the assignments of switch control signals 225 to phases $\phi_1$ and $\phi_2$, as depicted in FIGS. 2 and 3, are examples. In other embodiments, different conversion ratios may be achieved using other assignments of switch control signals 225 to phases $\phi_1$ and $\phi_2$, or any other suitable phases.

As described above, the assignment of switch control signals to different phases, can affect a conversion ratio for a particular interleave circuit included in switched-capacitor circuit 102. In addition to changing the conversion ratio for a particular interleave circuit, the use of additional phases can allow for an increased interleave factor for a given interleave circuit. By increasing the interleave factor, a particular interleave circuit can behave as multiple interleave circuits, with smaller capacitors, thereby reducing voltage ripple on regulated power supply node 108. As described below in more detail, the additional phases may operate with a phase difference from the original phases, so that the multiple interleave circuits operate at different times, in some cases with a slight overlap.

Figure 4:
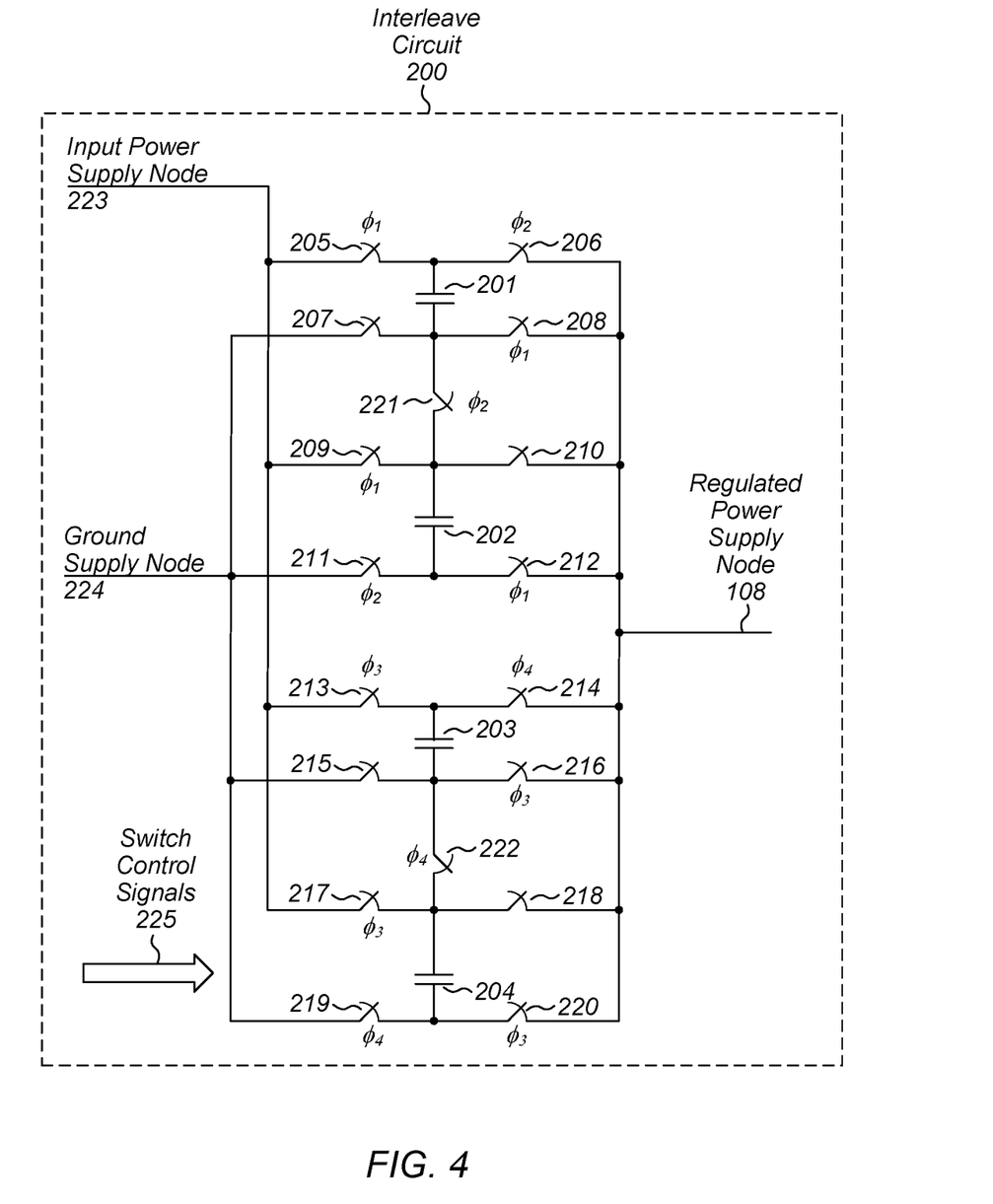
FIG. 4 is a block diagram of an embodiment of an interleave circuit with a different interleave factor.

Turning to FIG. 4, the use of four phases with interleave circuit 200 is depicted. As illustrated, the switch control signals corresponding to switches 205, 208 209, and 212 are assigned to phase $\phi_1$, while the switch control signals corresponding to switches 206, 211, and 221 as assigned to phase $\phi_2$. In a similar fashion, the switch control signals corresponding to switches 213, 216, 217, and 220 are assigned to phase $\phi_3$, while the switch control signals corresponding to switches 214, 219, and 222 are assigned to phase $\phi_4$.

During operation, switches 205, 208, 209, and 212 are closed during phase thereby coupling capacitors 201 and 202 in series between input power supply node 223 and regulated power supply node 108. When phase $\phi_1$ is complete, switches 205, 208, 209, and 212 are opened, and phase $\phi_2$ begins with the closing of switches 206, 211, and 221. With switches 206, 211, and 221 closed, capacitors 201 and 202 are coupled in series between regulated power supply node 108 and ground supply node 224.

After a phase shift has occurred from the start of phase 1, phase 3 is activated, closing switches 213, 216, 217, and 220, which coupled capacitors 203 and 202 in series between input power supply node 223 and regulated power supply node 108. When phase 3 is complete, switches 213, 216, 217, and 220 are opened, and phase 4 begins with the closing of switches 214, 219, and 222. With switches 214, 219, and 222 closed, capacitors 203 and 204 are coupled in series between ground supply node 224 and regulated power supply node 108.

With above described assignment of switch control signals, capacitors 201 and 202 function as one interleave circuit, while capacitors 203 and 204 function as a separate interleave circuit. Using such an arrangement, the embodiment depicted in FIG. 4 provides a conversion ratio of 3:2 with an interleave factor of 2.

Figure 5:
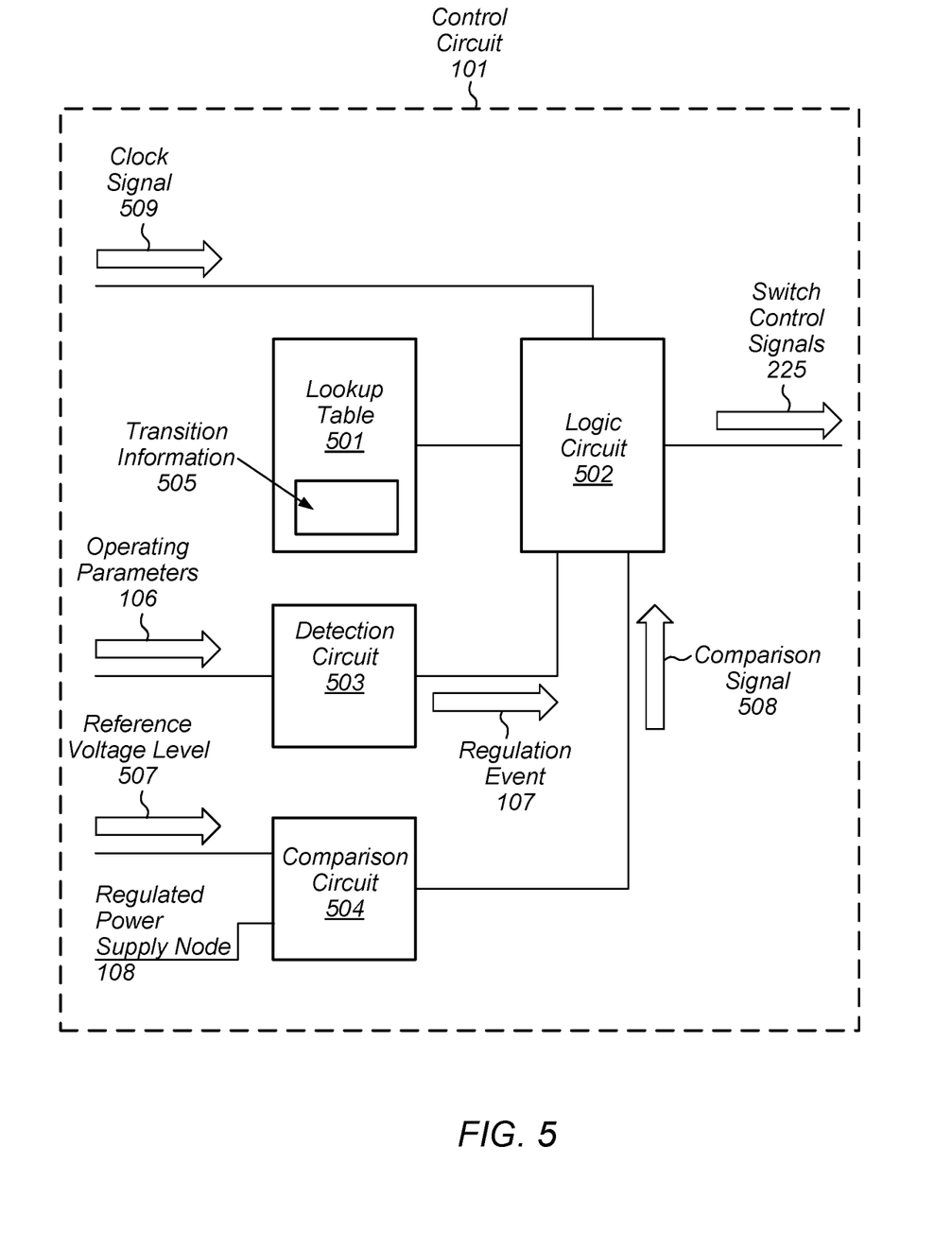
FIG. 5 is a block diagram of a control circuit used in a power converter circuit.

A block diagram of an embodiment of control circuit 101 is depicted in FIG. 5. As illustrated, control circuit 101 includes lookup table 501, logic circuit 502, detection circuit 503, and comparison circuit 504.

Lookup table 501 may, in various embodiments, be a particular embodiment of a static random-access memory (SRAM) circuit, register file, or other suitable data storage circuit configured to store transition information 505. In some cases, transition information 505 includes information indicative of a next one of switch control signals 225 to assert or activate based on a transition from one conversion ratio to another. As described below, logic circuit 502 may use transition information 505 in the generation of switch control signals 225.

Detection circuit 503 is configured to detect one or more regulation events, e.g., regulation event 107, using operating parameters 106. In various embodiments, detection circuit 503 may include any suitable combination of analog and digital circuits configured to compare particular ones of operating parameters 106 to corresponding threshold values. In response to a determination that a given one of operating parameters 106 exceeds its corresponding threshold value, detection circuit 503 may generate a signal indicative of a regulation event (e.g., regulation event 107).

Comparison circuit 504 is configured to compare a voltage level of regulated power supply node 108 to reference voltage level 507. In some embodiments, comparison circuit 504 may include any suitable combination of analog and digital circuits configured to compare the aforementioned voltage levels and generate comparison signal 508 using results of the comparison.

Figure 7A:
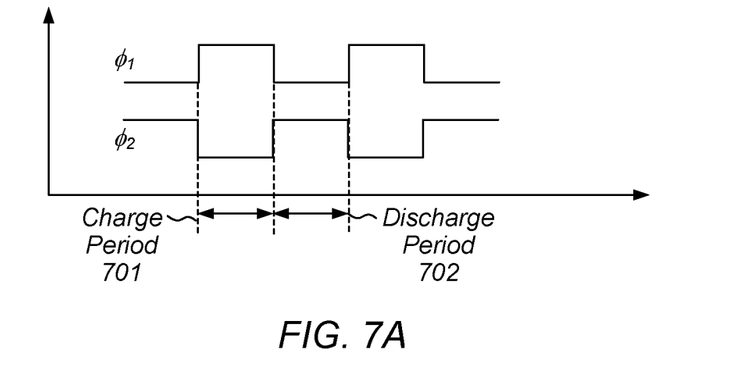
FIG. 7A depicts example waveforms for a two-phase system.
Figure 7B:
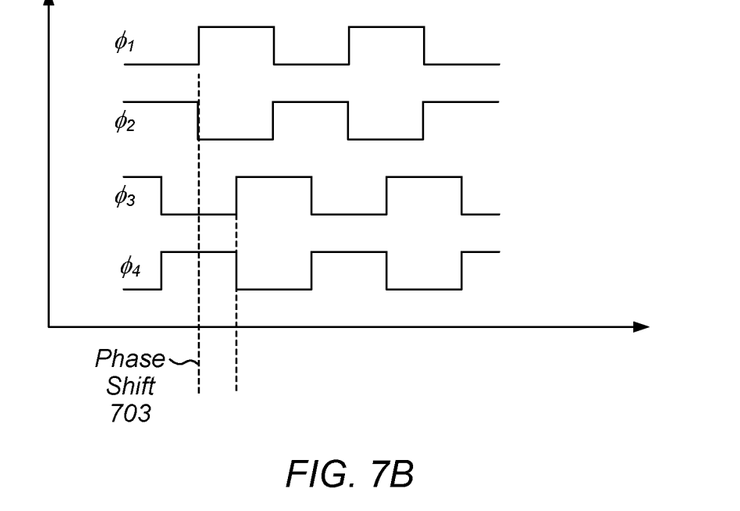
FIG. 7B depicts example waveforms for a four-phase system.

Logic circuit 502 may, in some embodiments, be a particular embodiment of a sequential logic circuit, state machine, or other suitable logic circuit configured to generate switch control signals 225. In various embodiments, logic circuit 502 may generate switch control signals 225 using clock signal 509 and comparison signal 508. In some cases, logic circuit 502 may assigned different ones of switch control signals 225 to different phases for activation. For example, as depicted in FIGS. 7A and 7B, logic circuit 502 may activate switch control signals assigned to phases $\phi_1$ and the later activate switch control signals assigned to phase $\phi_2$. In cases wherein additional phases are employed, switch control signals assigned to phase $\phi_3$ may be activated after a phase shift has occurred from phase $\phi_1$, and switch control signals assigned to phase $\phi_4$ may be activated after the phase shift from phase $\phi_2$ has occurred.

To generate switch control signals 225, logic circuit 502 may be further configured to change a frequency of a given one of switch control signals 225. In response to receiving regulation event 107, logic circuit 502 may be further configured to increase the frequency of the given one of switch control signals 225. Logic circuit 502 may, in response to a determination that the frequency of the given one of switch control signals 225 is at a maximum frequency value, change a conversion ratio of a given one of interleave circuits 103A-D. To change the conversion ratio, logic circuit 502 may re-assign one or more of switch control signals 225 to different phases.

Once the conversion ratio has been changed, Logic circuit 502 is further configured to activate a next one of switch control signals 225 based, at least in part, on transition information 405. For example, in a case where phase $\phi_1$ is active and the conversion ratio changes, logic circuit 502 may re-activate switch control signals assigned to phase $\phi_1$ in the new conversion ratio. By activating switch control signals 225 in this fashion, logic circuit 502 may improve the efficiency of switched-capacitor circuit 102.

During steady-state operation, i.e., there are no changes in operating parameters 106, logic circuit 502 may be configured to increase an interleave factor associated with any one of interleave circuits 103A-D. To increase the interleave factor, logic circuit 502 may re-assigned one or more of switch control signals 225 to different phases that are shifted from the phases to which the re-assigned switch control signals were originally assigned.

Figure 6:
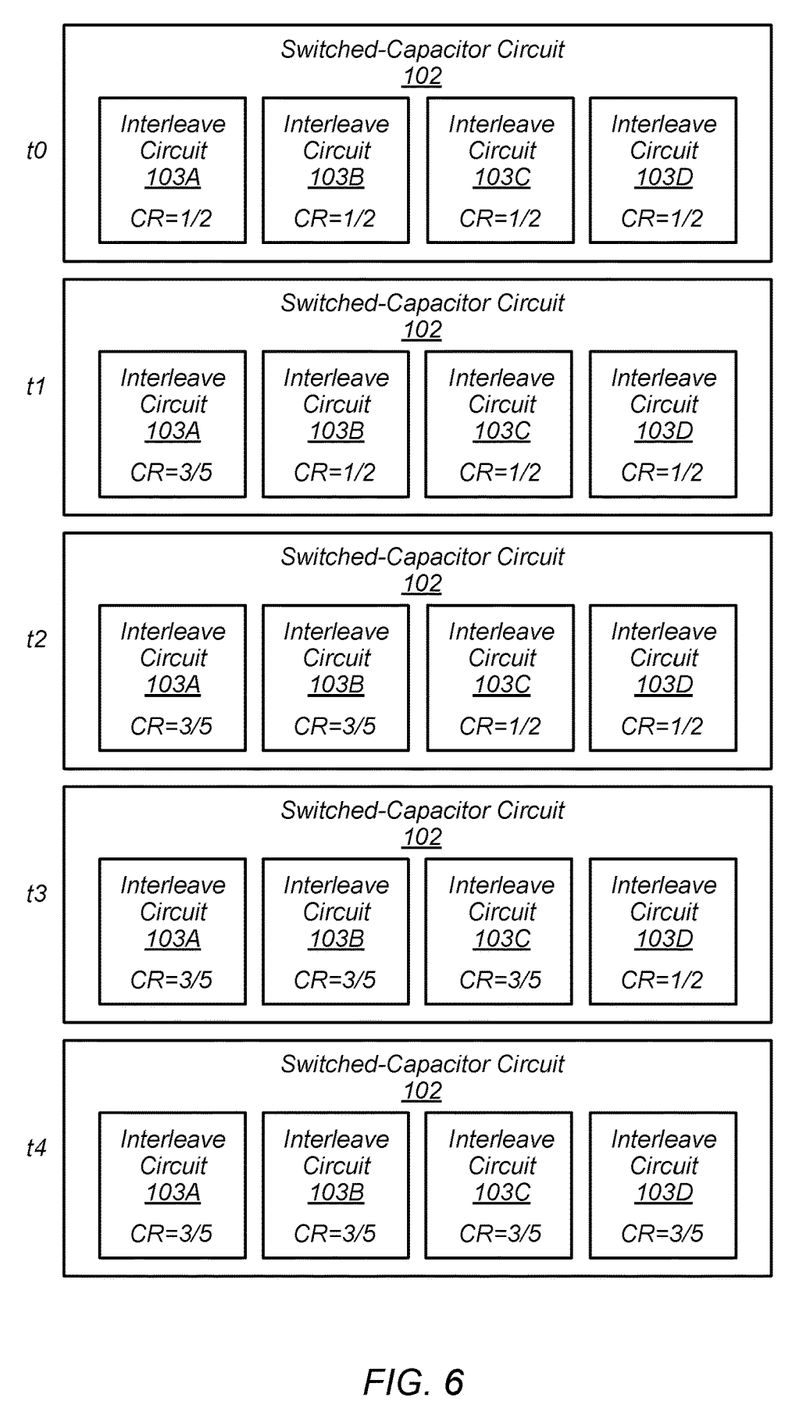
FIG. 6 is a block diagram depicting a transition of a power converter circuit from using one conversion ratio to using another conversion ratio.

Turning to FIG. 6, a block diagram depicting a change in the conversion ratios of interleave circuits 103A-103D is illustrated. At time t0, the conversion ratios of interleave circuits 103A-103D are set to ½. As noted above, the conversion ratios are set by assigning different switch control signals to different phases, thereby determining how the capacitors are couple to regulated power supply node 108 during charge and discharge periods.

Between time t0 and t1, a regulation event occurs. As described above, such regulation events may include an increase demand in output current from switched-capacitor circuit 102, a change in the voltage level of input power supply node 223, and the like. In response to regulation event, at time t1, control circuit 101 may attempt to increase a frequency of particular ones of switch control signals 406 coupled to interleave circuit 103A. If the frequency of the particular ones of switch control signals 406 is at a maximum frequency, control circuit 101 may change the conversion ratio of interleave circuit 103A from ½ to ⅗. It is noted that if regulation is achieved, further changes to the conversion ratios may be halted.

If regulation is not achieved by adjusting the conversion ratio of interleave circuit 103A, then control circuit 101 will attempt to increase, at time t2, the switching frequency of interleave circuit 103B in a similar fashion to that of interleave circuit 103A. When the switching frequency, of interleave circuit 103B reaches the maximum frequency, control circuit 101 changes the conversion ratio of interleave circuit 103B from ½ to ⅗.

The process repeats at times t3 and t4 until the conversion ratios of interleave circuits 103C and 103D are at ⅗. If regulation is still not achieved, control circuit 101 may repeat the process by progressively changing the switching frequencies and conversion ratios of interleave circuits 103A-103D. In some cases, when the demand in the output current of switched-capacitor circuit 102 decreases, control circuit 101 may reduce change the switching frequencies and conversion ratios of interleave circuits 103A-103D in a reverse of the process described above. It is noted that although only four interleave circuits are depicted in FIG. 6, in other embodiments, any suitable number of interleave circuits may be employed.

Example waveforms associated with phases $\phi_1$ and $\phi_2$ are depicted in FIG. 7A. It is noted that the waveforms for phases $\phi_1$ and $\phi_2$ may correspond to waveforms associated with switch control signals assigned to these phases. It some cases, switches (e.g., switch 205) may include multiple devices, in which case a particular one of switch control signals 225 may include multiple signal lines with different logical polarities.

As illustrated, during charge period 701, phase $\phi_1$ is active and phase $\phi_2$ is inactive. As depicted, a phase is active when signals assigned to the phase are at a logical-1 or high logic level, and the phase is inactive when the signals assigned to the phase are at a logical-0 or low logic level. In other embodiments, different criteria for active and inactive may be employed. After a period of time has expired, charge period 701 completes, and discharge period 702 begins. During discharge period 702, phase $\phi_1$ is inactive while phase $\phi_2$ is active.

It is noted that the frequency of phases $\phi_1$ and $\phi_2$ may be changed during operation of power converter circuit 100. Additionally, although charge period 701 and discharge period 702 are depicted as having substantially the same durations, in other embodiments, a duration of charge period 701 may be different from a duration of discharge period 702.

As described above, logic circuit 502 may use additional phases to increase an interleave factor of a given one of interleave circuits 103A-D. Example waveforms associated with using four phases are depicted in FIG. 7B.

As illustrated, phases $\phi_1$ and $\phi_2$ behave in a similar fashion as that depicted in FIG. 7A. After phase shift 703 occurs, phase $\phi_3$ becomes active while phase 4 becomes inactive. In the present embodiment, phases $\phi_3$ and $\phi_4$ have a similar relationship to each other as phases $\phi_1$ and $\phi_2$ have to each other. Phase shift 703 allows switch control signals assigned to phases $\phi_3$ and $\phi_4$ to operate a subset of switches in a given interleave circuit independent of the switches assigned to phases $\phi_1$ and $\phi_2$, thereby increasing the interleave factor of the given interleave circuit. As noted above, the frequency and duty cycle of phases $\phi_3$ and $\phi_4$ may vary during operation of power converter circuit 100.

Figure 8:
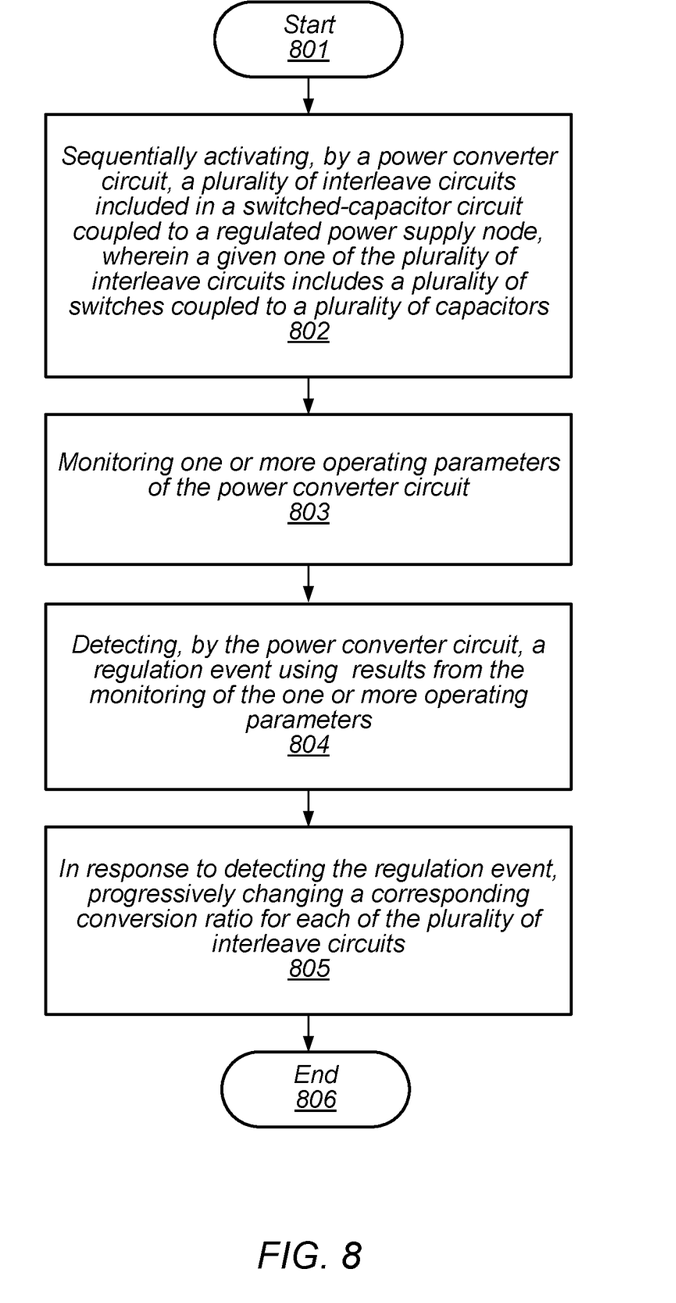
FIG. 8 depicts a flow diagram illustrating an embodiment of a method for operating a power converter circuit.

Turning to FIG. 8, a flow diagram depicting an embodiment of a method for operating a power converter circuit is illustrated. The method, which begins in block 801, may be applied to various power converter circuits, such as power converter circuit 100 as illustrated in FIG. 1.

The method includes sequentially activating, by a power converter circuit, a plurality of interleave circuits included in a switched-capacitor circuit coupled to a regulated power supply node, where a given one of the plurality of interleave circuits includes a plurality of switches coupled to a plurality of capacitors (block 802). In various embodiments, sequentially activating the plurality of interleave circuits includes closing a first subset of the plurality of switches for a first time period to charge the regulated power supply node using a subset of the plurality of capacitors, and closing a second subset of the plurality of switches for a second time period to discharge the regulated power supply node using the subset of the plurality of capacitors. In some embodiments, the first and second subsets of the plurality of switches and the subset of the plurality of capacitors are specified by a particular conversion ratio corresponding to the given interleave circuit.

The method also includes monitoring one or more operating parameters of the power converter circuit (block 803). In various embodiments, the one or more operating parameters includes an output current of the power converter circuit. In other embodiments, the one or more operating parameters includes a voltage level of an input power supply node coupled to the power converter circuit.

The method further includes detecting, by the power converter circuit, a regulation event using results from the monitoring of the one or more operating parameters (block 804).

The method also includes, in response to detecting the regulation event, progressively changing a corresponding conversion ratio for each of the plurality of interleave circuits (block 805). In various embodiments, progressively changing the corresponding conversion ratio for each of the plurality of interleave circuits includes checking the switching frequency of a particular interleave circuit.

The method may further include, in response to determining that the switching frequency is less than a threshold value, increasing a value of the switching frequency associated with a plurality of switch control signals coupled to the particular interleave circuit, otherwise, changing the corresponding conversion ratio for the particular interleave circuit. In some cases, changing the corresponding conversion ratio for the particular interleave circuit includes retrieving transition information from a lookup table.

The method may also include determining a next switch control signal of the plurality of switch control signals to assert based on, at least in part, the transition information and independent of a currently asserted switch control signal of the plurality of switch control signals. The method concludes in block 806.

Figure 9:
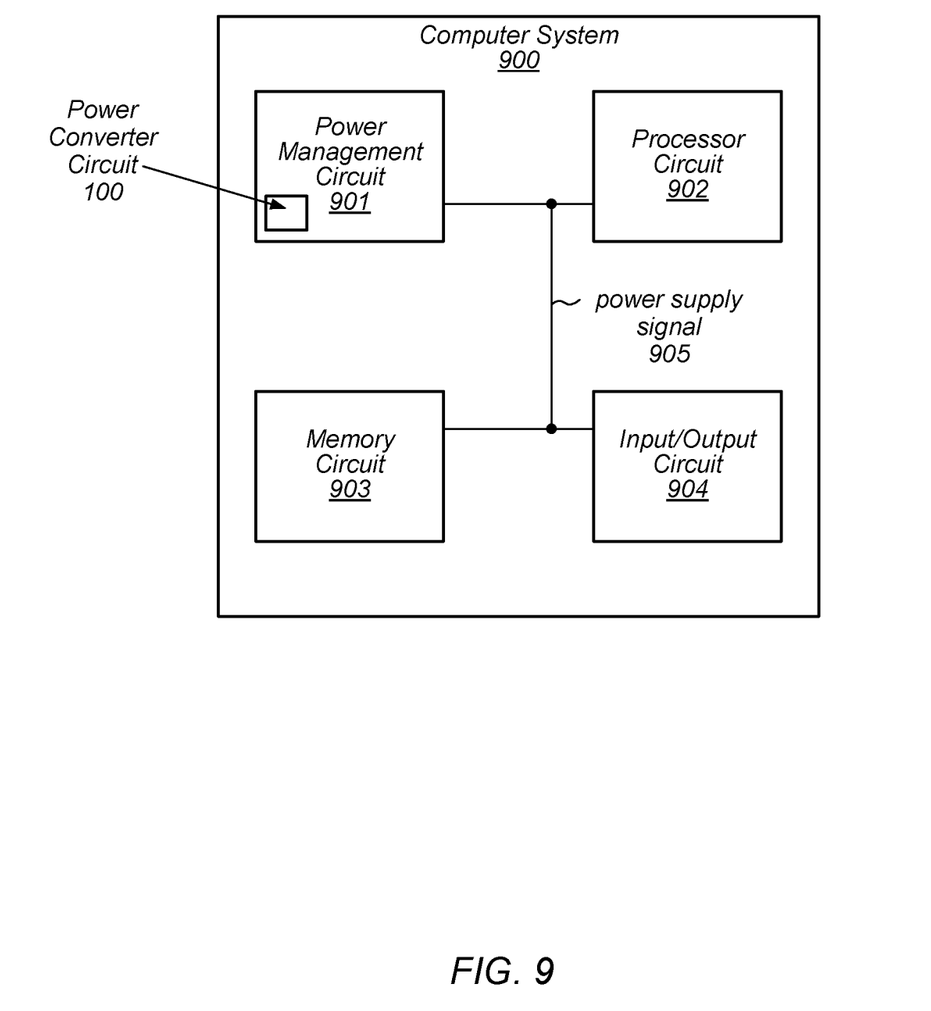
FIG. 9 illustrates a block diagram of a computer system.

A block diagram of computer system is illustrated in FIG. 9. In the illustrated embodiment, the computer system 900 includes power management unit 901, processor circuit 902, memory circuit 903, and input/output circuits 904, each of which is coupled to power supply signal 905. In various embodiments, computer system 900 may be a system-on-a-chip (SoC) and/or be configured for use in a desktop computer, server, or in a mobile computing application such as, e.g., a tablet, laptop computer, or wearable computing device.

Power management unit 901 includes power converter circuit 100, which is configured to generate a regulated voltage level on power supply signal 905 in order to provide power to processor circuit 902, memory circuit 903, and input/output circuits 904. Although power management unit 901 is depicted as including a single power converter circuit, in other embodiments, any suitable number of power converter circuits may be included in power management unit 901, each configured to generate a regulated voltage level on a respective one of multiple internal power supply signals included in computer system 900. In cases where multiple power converter circuits are employed, two or more of the multiple power converter circuits may be connected to a common set of power terminals that connections to power supply signals and ground supply signals of computer system 900.

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 903 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 9, in other embodiments, any suitable number of memory circuits may be employed.

Input/output circuits 904 may be configured to coordinate data transfer between computer system 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol.

Input/output circuits 904 may also be configured to coordinate data transfer between computer system 900 and one or more devices (e.g., other computing systems or integrated circuits) coupled to computer system 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a switched-capacitor circuit including a plurality of interleave circuits, wherein the switched-capacitor circuit is configured sequentially activate each of the plurality of interleave circuits to generate a particular voltage level on a regulated power supply node, wherein a particular interleave circuit includes a plurality of switches coupled to a plurality of capacitors; and
    a control circuit configured to:
        monitor one or more operating parameters associated with the switched-capacitor circuit;
        detect a regulation event using results from monitoring the one or more operating parameters; and
        in response to a detection of a regulation event, progressively change a corresponding conversion ratio for each of the plurality of interleave circuits.

2. The apparatus of claim 1, wherein to activate a given interleave circuit of the plurality of interleave circuits, the switched-capacitor circuit is further configured to:
    close a first subset of the plurality of switches for a first time period to charge the regulated power supply node using a subset of the plurality of capacitors; and
    close a second subset of the plurality of switches for a second time period to discharge the regulated power supply node using the subset of the plurality of capacitors; and
    wherein the first and second subsets of the plurality of switches and the subset of the plurality of capacitors are specified by a particular conversion ratio corresponding to the given interleave circuit.

3. The apparatus of claim 2, wherein to progressively change the corresponding conversion ratio for each of the plurality of interleave circuits, the control circuit is further configured to:
    check a switching frequency of a particular interleave circuit of the plurality of interleave circuits;
    in response to a determination that the switching frequency is less than a threshold value:
        increase a value of the switching frequency associated with a plurality of switch control signals coupled to the particular interleave circuit; and
        otherwise, change the corresponding conversion ratio for the particular interleave circuit.

4. The apparatus of claim 3, wherein to change the corresponding conversion ratio for the particular interleave circuit, the control circuit is further configured to generate the plurality of switch control signals using transition information based, at least in part, on the corresponding conversion ratio.

5. The apparatus of claim 1, wherein to monitor the one or more operating parameters, the control circuit is further configured to monitor a voltage level of an input power supply node coupled to the switched-capacitor circuit.

6. The apparatus of claim 1, wherein to monitor the one or more operating parameters, the control circuit is further configured to monitor an output current of the switched-capacitor circuit.

7. A method, comprising:
    sequentially activating, by a power converter circuit, a plurality of interleave circuits included in a switched-capacitor circuit coupled to a regulated power supply node, wherein a given one of the plurality of interleave circuits includes a plurality of switches coupled to a plurality of capacitors;
    monitoring one or more operating parameters of the power converter circuit;
    detecting, by the power converter circuit, a regulation event using results from monitoring of the one or more operating parameters; and
    in response to detecting the regulation event, progressively changing a corresponding conversion ratio for each of the plurality of interleave circuits.

8. The method of claim 7, wherein sequentially activating the plurality of interleave circuits includes:

closing a first subset of the plurality of switches for a first time period to charge the regulated power supply node using a subset of the plurality of capacitors; and closing a second subset of the plurality of switches for a second time period to discharge the regulated power supply node using the subset of the plurality of capacitors; and wherein the first and second subsets of the plurality of switches and the subset of the plurality of capacitors are specified by a particular conversion ratio corresponding to the given one of the plurality of interleave circuits.

9. The method of claim 7, wherein progressively changing the corresponding conversion ratio for each of the plurality of interleave circuits includes:

checking a switching frequency of a particular interleave circuit;

in response to determining that the switching frequency is less than a threshold value:

increasing a value of the switching frequency associated with a plurality of switch control signals coupled to the particular interleave circuit; and otherwise, changing the corresponding conversion ratio for the particular interleave circuit.

10. The method of claim 7, wherein changing the corresponding conversion ratio for a particular interleave circuit includes retrieving transition information from a lookup table.

11. The method of claim 10, further comprising, determining a next switch control signal of a plurality of switch control signals to assert based on, at least in part, the transition information and independent of a currently asserted switch control signal of the plurality of switch control signals.

12. The method of claim 7, wherein the one or more operating parameters includes an output current of the power converter circuit.

13. The method of claim 7, wherein the one or more operating parameters includes a voltage level of an input power supply node coupled to the power converter circuit.

14. An apparatus, comprising:

a switched-capacitor circuit coupled to a regulated power supply node, wherein the switched-capacitor circuit includes a plurality of capacitors arranged in a plurality of segments each including at least one capacitor of the plurality of capacitors, and wherein the switched-capacitor circuit is configured, for a given one of a plurality of switching events, to:

charge, for a charge period, the regulated power supply node using a given one of the plurality of segments; and discharge, for a discharge period, the regulated power supply node using the given one of the plurality of segments; and a control circuit configured, in response to a determination that a load current being drawn from the regulated power supply node has reached a steady-state, increase a number of segments in the plurality of segments.

15. The apparatus of claim 14, wherein the switched-capacitor circuit is further configured, for a different one of the plurality of switching events, to:

charge, for the charge period, the regulated power supply node using a different one of the plurality of segments; and discharge, for the discharge period, the regulated power supply node using the different one of the plurality of segments.

16. The apparatus of claim 14, wherein the control circuit is further configured, in response to a detection of a change in load current, to decrease the number of segments in the plurality of segments.

17. The apparatus of claim 16, wherein the control circuit is further configured to change a conversion ratio associated with the switched-capacitor circuit, in response to the detection of the change in load current.

18. The apparatus of claim 14, wherein each segment of the plurality of segments includes a respective plurality of switches, and wherein to charge, for the charge period, the regulated power supply node using the given one of a plurality of segments, the switched-capacitor circuit is further configured close, using a plurality of switch control signals, a first subset of a corresponding plurality of switches included in the given one of the plurality of segments.

19. The apparatus of claim 18, wherein to discharge, for the discharge period, the regulated power supply node using the given one of the plurality of segments, the switched-capacitor circuit is further configured to:

open the first subset of the corresponding plurality of switches using the plurality of switch control signals; and close a second subset of the corresponding plurality of switches using the plurality of switch control signals.

20. The apparatus of claim 19, wherein the control circuit is further configured to generate the plurality of switch control signals using a reference clock signal.

* * * * *